(12) United States Patent
Fujiwara et al.

(10) Patent No.: US 10,507,819 B2
(45) Date of Patent: Dec. 17, 2019

(54) METHOD FOR CONTROLLING HYBRID VEHICLE AND DEVICE FOR CONTROLLING HYBRID VEHICLE

(71) Applicant: NISSAN MOTOR CO., LTD., Yokohama-shi, Kanagawa-ku (JP)

(72) Inventors: Kengo Fujiwara, Kanagawa (JP); Ken Itou, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/308,176

(22) PCT Filed: Jun. 8, 2016

(86) PCT No.: PCT/JP2016/067088
§ 371 (c)(1),
(2) Date: Dec. 7, 2018

(87) PCT Pub. No.: WO2017/212581
PCT Pub. Date: Dec. 14, 2017

(65) Prior Publication Data
US 2019/0299967 A1 Oct. 3, 2019

(51) Int. Cl.
*B60W 20/00* (2016.01)
*B60K 6/20* (2007.10)
*B60W 50/00* (2006.01)

(52) U.S. Cl.
CPC ............ *B60W 20/00* (2013.01); *B60K 6/20* (2013.01); *B60W 50/00* (2013.01); *B60W 2050/0056* (2013.01); *B60W 2710/305* (2013.01)

(58) Field of Classification Search
CPC .............. B60W 20/00; B60W 50/00; B60W 2050/0056; B60K 6/20
See application file for complete search history.

(56) References Cited

U.S. PATENT DOCUMENTS 5,527,238 A * 6/1996 Hrovat ................. F16H 61/143
477/166
5,642,707 A * 7/1997 Cerf ..................... F02D 31/005
123/339.23

(Continued)

FOREIGN PATENT DOCUMENTS

JP 03-182873 8/1991
JP 05-002405 A 1/1993

(Continued)

*Primary Examiner* — Ramsey Refai
(74) *Attorney, Agent, or Firm* — Foley & Lardner LLP

(57) ABSTRACT

The control method for the hybrid vehicle includes a rotation speed control torque calculation step of, based on a rotation speed command value for the electric generator and a rotation speed detection value of the electric generator, calculating a torque command value for controlling the rotation speed of the electric generator, and an electric generator control step of controlling the electric generator according to the torque command value. The rotation speed control torque calculation step calculates, using the model matching compensator and based on a value obtained by filtering the rotation speed detection value through the low-pass filter and the rotation speed command value, a basic torque command value that makes a torque response of the electric generator coincide with a preset model response, calculates, using the disturbance observer including the transfer function composed of the inverse system of the control object model patterned after a power transmission system of the electric generator connected to the engine via the gears and a disturbance observer filter, and based on the rotation speed detection value, a disturbance torque that is input into the power transmission system, and calculates the torque command value based on the basic torque command value and the disturbance torque. The relative degree of the disturbance observer filter is set so that the relative degree of the transfer function becomes 1 or more.

4 Claims, 7 Drawing Sheets

(56) References Cited

U.S. PATENT DOCUMENTS

| | | | |
|---|---|---|---|
| 6,208,034 B1 * | 3/2001 | Yamaguchi | B60K 6/365 290/40 C |
| 7,194,899 B1 * | 3/2007 | Chen | F02D 41/0097 73/114.25 |
| 7,896,114 B2 * | 3/2011 | Colvin | B60K 6/48 180/65.28 |
| 8,209,103 B2 * | 6/2012 | Oyama | B60K 6/445 701/101 |
| 2002/0190683 A1 | 12/2002 | Karikomi et al. | |
| 2006/0201468 A1 * | 9/2006 | Lancaster | F01N 3/323 123/179.5 |
| 2006/0208683 A1 | 9/2006 | Ide | |
| 2009/0088913 A1 * | 4/2009 | Oyama | B60K 6/445 701/22 |
| 2009/0243533 A1 | 10/2009 | Zhang et al. | |
| 2012/0016549 A1 | 1/2012 | Katsumata et al. | |
| 2013/0103239 A1 | 4/2013 | Kamijo | |
| 2014/0188319 A1 | 7/2014 | Ohno et al. | |

FOREIGN PATENT DOCUMENTS

| | | |
|---|---|---|
| JP | 2003-009566 A | 1/2003 |
| JP | 2004-280563 A | 10/2004 |
| JP | 2008-217259 A | 9/2008 |
| JP | 2009-298266 A | 12/2009 |
| JP | 2010-200568 A | 9/2010 |
| JP | 2011-010535 A | 1/2011 |
| JP | 2013-038868 A | 2/2013 |
| JP | 2013-091346 A | 5/2013 |
| JP | 2014-053988 A | 3/2014 |
| JP | 2014-220919 A | 11/2014 |
| WO | WO 2007/138758 A1 | 12/2007 |

* cited by examiner

METHOD FOR CONTROLLING HYBRID VEHICLE AND DEVICE FOR CONTROLLING HYBRID VEHICLE

TECHNICAL FIELD

The present invention relates to a method for controlling a hybrid vehicle and a device for controlling a hybrid vehicle.

BACKGROUND ART

In a vehicle including a motor and an engine as drive power sources, when motor torque crosses 0 Nm during operation of the engine, backlash noise (rattling noise) occurs due to collision between gears. In the technique of JP 2009-298266A, when motor torque is within a predetermined range near 0 Nm, rattling noise is reduced by increasing the target engine rotation speed.

SUMMARY OF INVENTION

However, in the technique of JP 2009-298266A that increases the engine rotation speed for reducing the rattling noise, there is a problem that engine noise increases.

In the meantime, the above-described problem can occur as long as a motor and an engine are coupled to each other via gears. Therefore, the same problem as above occurs also in a vehicle including an engine as a power source for an electric generator to generate electric power, i.e. not an engine as a drive power source of a vehicle.

When torque transmitted between an engine and an electric generator is relatively small, rattling noise occurs due to collision between gears transmitting power between the engine and the electric generator, the collision between the gears caused by torque pulsation due to piston motion during rotation of the engine. For example, in a motoring state such as when cranking the engine using power of the electric generator, engine torque is only friction and tends to be affected by torque pulsation so that rattling noise tends to occur. However, since torque control by the engine cannot be performed in the motoring state, it is not possible to reduce rattling noise using the engine.

It is an object of the present invention to provide a technique that avoids rattling noise by rotation speed control of an electric generator with no need to increase the engine rotation speed.

According to one embodiment of the present invention, a control method for the hybrid vehicle including the engine and the electric generator that generates electric power using power from the engine connected to the electric generator via the gears, wherein the control method includes a rotation speed control torque calculation step of, based on a rotation speed command value for the electric generator and a rotation speed detection value of the electric generator, calculating a torque command value for controlling the rotation speed of the electric generator, and an electric generator control step of controlling the electric generator according to the torque command value. The rotation speed control torque calculation step calculates, using the model matching compensator and based on a value obtained by filtering the rotation speed detection value through the low-pass filter and the rotation speed command value, a basic torque command value that makes a torque response of the electric generator coincide with a preset model response, calculates, using the disturbance observer including the transfer function composed of the inverse system of the control object model patterned after a power transmission system of the electric generator connected to the engine via the gears and a disturbance observer filter, and based on the rotation speed detection value, a disturbance torque that is input into the power transmission system, and calculates the torque command value based on the basic torque command value and the disturbance torque. The relative degree of the disturbance observer filter is set so that the relative degree of the transfer function becomes 1 or more.

The following describes the embodiments of the present invention in detail with accompanying drawings.

MODE FOR CARRYING OUT INVENTION

Embodiment

Figure 1:
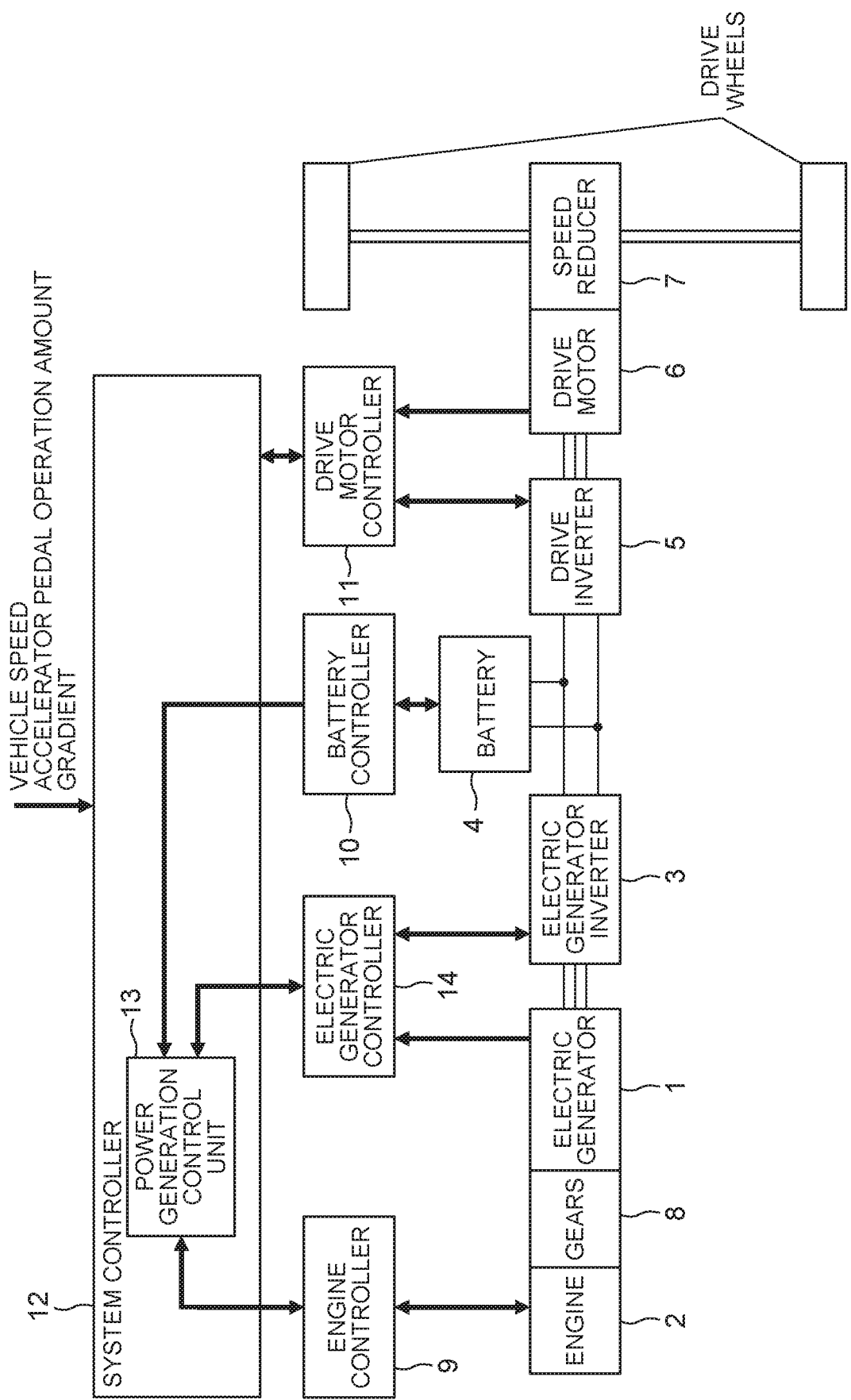
FIG. 1 is a system configuration diagram of a vehicle to which a control device for a hybrid vehicle of an embodiment is applied.

FIG. 1 is a block diagram showing the system configuration of a hybrid vehicle to which a hybrid vehicle control device in an embodiment of the present invention is applied. FIG. 1 shows a configuration example in which the control device is applied to the series hybrid vehicle equipped with a motor for power generation (hereinafter referred to as an electric generator 1) and a motor for driving (hereinafter referred to as a drive motor 6). As shown in the figure, the hybrid vehicle of this embodiment includes the electric generator 1, an engine 2, gears 8, an electric generator inverter 3, a battery 4, a drive inverter 5, the drive motor 6, a speed reducer 7, an engine controller 9, a battery controller 10, a drive motor controller 11, a system controller 12, a power generation control unit 13, and an electric generator controller 14.

The engine 2 is connected to the electric generator 1 via the gears 8 and transmits power to the electric generator 1 for allowing the electric generator 1 to generate electric power. Since the vehicle to which the hybrid vehicle control device of this embodiment is applied is of the series type, the engine 2 is used only as a drive source for rotationally driving the electric generator 1.

The electric generator 1 is rotated by power from the engine 2 to generate electric power. Further, the electric generator 1 also performs motoring to consume electric power by cranking the engine 2 using power of the electric generator 1 when starting the engine 2 or by power-running the engine 2 using power of the electric generator 1.

The electric generator inverter 3 is connected to the electric generator 1, the battery 4, and the drive inverter 5 and converts AC power generated by the electric generator 1 into DC power. Further, the electric generator inverter 3 converts DC power supplied from the battery 4 into AC power and supplies the AC power to the electric generator 1.

The drive inverter 5 converts DC power supplied from the battery 4 or the electric generator inverter 3 into AC power and supplies the AC power to the drive motor 6. Further, the drive inverter 5 converts AC power regenerated by the drive motor 6 into DC power and supplies the DC power to the battery 4.

The drive motor 6 generates driving force by alternating current supplied from the drive inverter 5 and transmits the driving force to drive wheels via the speed reducer 7. Further, the drive motor 6 generates regenerative driving force when rotated by the drive wheels during deceleration of the vehicle, coasting of the vehicle, or the like, thereby recovering kinetic energy of the vehicle as electrical energy.

The engine controller 9 adjusts the intake air amount by a throttle actuator, the fuel injection amount by injectors, and the ignition timing by spark plugs according to state signals such as rotation speed and temperature of the engine 2 so that engine torque coincides with an engine torque command value from the system controller 12.

The battery controller 10 measures the state of charge (SOC: State Of Charge) based on current and voltage that are charged into and discharged from the battery 4, and transmits the measured information to the system controller 12. Further, the battery controller 10 calculates an inputtable electric power and an outputtable electric power of the battery 4 according to temperature, internal resistance, and SOC of the battery 4 and transmits the calculated values to the system controller 12.

The drive motor controller 11 performs switching control of the drive inverter 5 according to states, such as rotation speed and voltage, of the drive motor 6 so that drive motor torque coincides with a motor torque command value from the system controller 12.

The system controller 12 calculates a motor torque command value for the drive motor 6 according to information such as vehicle states including accelerator position, vehicle speed, and road surface gradient, SOC information, inputtable electric power, and outputtable electric power from the battery controller 10, and generated electric power of the electric generator 1. Further, the system controller 12 calculates a target power-generation electric power for supply from the electric generator 1 to the battery 4 or the drive motor 6.

In order to achieve the target power-generation electric power, the power generation control unit 13 in the system controller 12 calculates an engine torque command value to be given to the engine controller 9 and a rotation speed command value $\omega_G^*$ for the electric generator to be given to the electric generator controller 14.

The electric generator controller 14 performs switching control of the electric generator inverter 3 according to states, such as rotation speed detection value and voltage, of the electric generator 1 so that the electric generator rotation speed coincides with the electric generator rotation speed command value from the system controller 12.

Figure 2:
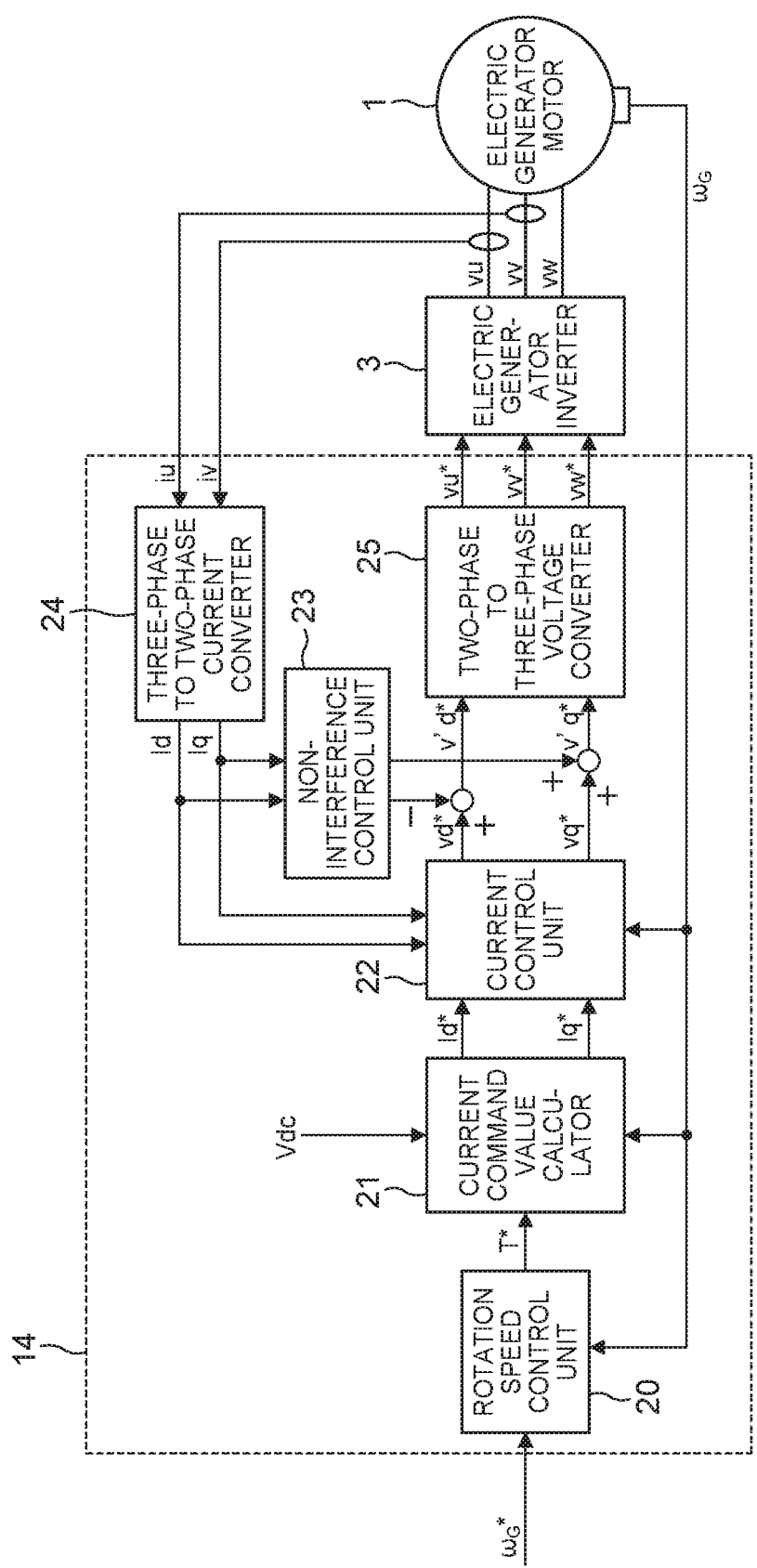
FIG. 2 is a control block diagram of an electric generator controller.

FIG. 2 is a control block diagram for explaining switching control of the electric generator inverter 3 that is performed by the electric generator controller 14.

The electric generator controller 14 includes a rotation speed control unit 20, a current command value calculator 21, a current control unit 22, a non-interference control unit 23, a three-phase to two-phase current converter 24, and a two-phase to three-phase voltage converter 25.

Based on a rotation speed command value $\omega_G^*$ from the system controller 12 and a rotation speed detection value $\omega_G$ of the electric generator 1, the rotation speed control unit 20 calculates a torque command value T* for controlling the rotation speed of the electric generator 1. The rotation speed detection value $\omega_G$ is detected by a rotation speed detection device (e.g. resolver, encoder, or the like) attached to the electric generator 1.

The current command value calculator 21 calculates a d-axis current command value id* and a q-axis current command value iq* based on the torque command value T*, the rotation speed detection value $\omega_G$, and a battery voltage Vdc of the battery 4. A table defining the relationship of a d-axis current command value and a q-axis current command value with a torque command value, an electric generator rotation speed, and a DC voltage value may be prepared in advance, and a d-axis current target value id* and a q-axis current target value iq* may be obtained by referring to this table.

The current control unit 22 calculates d-axis and q-axis voltage command values vd*, vq* based on the d-axis and q-axis current command values id*, iq*, d-axis and q-axis currents id, iq calculated by the three-phase to two-phase current converter 24, and the rotation speed detection value $\omega_G$.

Based on the d-axis and q-axis currents id, iq, the non-interference control unit 23 calculates a non-interference control voltage that is necessary for the d-axis and q-axis voltage command values vd*, vq* to cancel an interference voltage between d-q orthogonal coordinate axes.

The three-phase to two-phase current converter 24 calculates the d-axis and q-axis currents id, iq based on at least two-phase currents (e.g. U-phase current $i_u$ and V-phase current iv) of three-phase alternating currents that are supplied from the electric generator inverter 3 to the electric generator 1.

The two-phase to three-phase voltage converter 25 calculates three-phase voltage command values $V_u^*, V_v^*, V_w^*$ for U, V, and W phases by performing a coordinate transformation based on final voltage command values v'd*, v'q* in which the non-interference control voltage is taken into account.

The electric generator inverter 3 includes two pairs of switching elements (e.g. power semiconductor elements such as IGBTs or MOSFETs) for each phase. The electric generator inverter 3 converts DC power supplied from the battery 4 into AC voltages $V_u, V_v, V_w$ by turning on and off the switching elements according to the three-phase voltage command values $V_u^*, V_v^*, V_w^*$ generated by the electric generator controller 14 and supplies the AC voltages $V_u, V_v, V_w$ to the electric generator 1.

Next, details of a rotation speed control system by the control device for the hybrid vehicle in this embodiment will be described.

Figure 3:
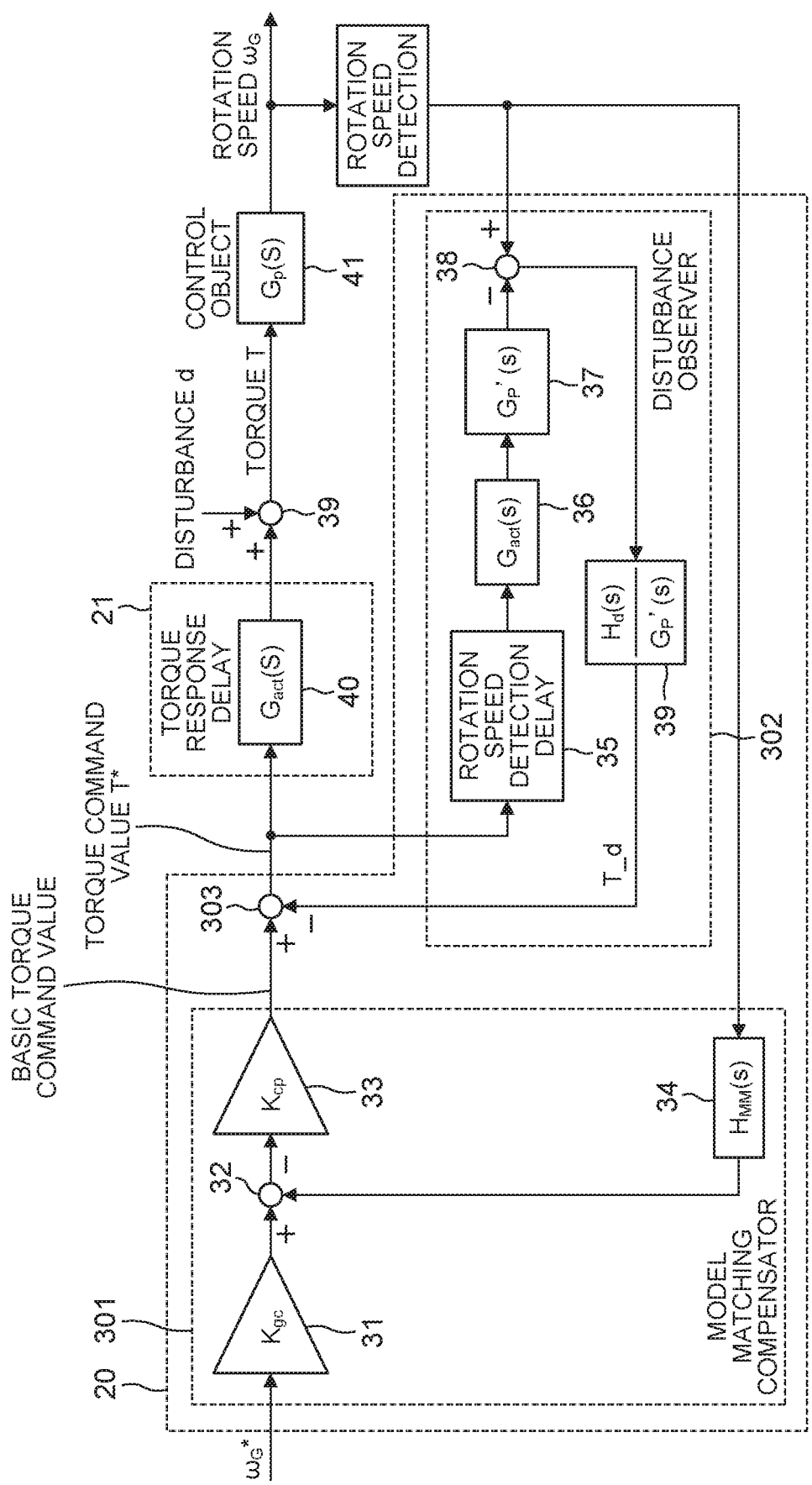
FIG. 3 is a block diagram of a rotation speed control unit.

FIG. 3 is a diagram for explaining the rotation speed control system in this embodiment and is a block diagram mainly showing details of the rotation speed control unit 20 (see FIG. 2). The rotation speed control unit 20 includes a model matching compensator 301, a disturbance observer 302, and a subtractor 303.

Based on a rotation speed command value $\omega_G^*$ and a rotation speed detection value $\omega_G$ as inputs, the rotation speed control unit 20 outputs a torque command value T*. In the current command value calculator 21, the torque command value T* becomes a torque T in which a torque response delay 40 ($G_{act}(s)$) of the electric generator 1 being a physical delay element is taken into account, and the torque T is transmitted to a control object 41 ($G_p(s)$). In the present invention, a system from the input of the rotation speed command value $\omega_G^*$ until the torque T is input into the control object $G_p$ so that the electric generator 1 is controlled to the rotation speed (o is defined as a rotation speed control system. Further, a power transmission system of the electric generator 1 connected to the engine 2 via the gears 8 is defined as a control object.

The torque response delay $G_{act}(s)$ that is taken into account in the torque command value T* in the current command value calculator 21 is given by the following formula.

[Math. 1]

$$G_{act}(s) = \frac{1}{T_{act}s + 1} \quad (1)$$

where s is a Laplace operator and $T_{act}$ is a time constant of torque response delay.

The control object $G_p(s)$ receives the torque T and outputs the rotation speed $\omega_G$. The control object $G_p(s)$ is given by the following formula.

[Math. 2]

$$G_p(s) = \frac{1}{Js + C} \quad (2)$$

where J and C are parameters indicating states of the control object. J is total inertia (moment of inertia) of the electric generator 1, the engine 2, and the gears 8 interposed between the electric generator 1 and the engine 2 in terms of a rotary shaft of the electric generator 1. C is a viscous friction coefficient.

The model matching compensator 301 includes a gain 31 ($K_{gc}$), a gain 33 ($K_{cp}$), a model matching compensator filter 34 ($H_{MM}(s)$), and a subtractor 32. The model matching compensator 301 outputs as a basic torque command value a value obtained by multiplying a difference, between a value obtained by multiplying the rotation speed command value $\omega_G^*$ by the gain $K_{gc}$ and a value obtained by filtering the rotation speed detection value $\omega_G$ through the model matching compensator filter $H_{MM}(s)$, by the gain $K_{cp}$.

The gain $K_{gc}$ and the gain $K_{cp}$ are set so that a response of a rotation speed $\omega_G$ to a torque T input into the control object $G_p(s)$ becomes a model response set by a designer, and are given by the following formulas (3).

[Math. 3]

$$K_{gc} = \frac{J'}{J' - C'T_m} \quad (3)$$

$$K_{cp} = \frac{J' - C'T_m}{T_m}$$

where $T_m$ is a time constant of model response, J' is a design value or a measured value of total inertia of the electric generator 1, the gears 8, and the engine 2 in terms of the electric generator shaft, and C' is a design value of viscous friction coefficient. That is, J' and C' are set to be equal to an actual control object.

The model matching compensator filter $H_{MM}(s)$ is a first-order low-pass filter and is given by the following formula.

[Math. 4]

$$H_{MM}(s) = \frac{1}{T_{MM}s + 1} \quad (4)$$

Where $T_{MM}$ is a time constant of the model matching compensator filter $H_{MM}(s)$.

The time constant $T_{MM}$ is set to smooth rotation speed detection values for feedback. Consequently, it can be avoided that when rotation speed fluctuation due to backlash of the gears 8 and torque pulsation of the engine 2 is fed back as it is, its vibration components before and after feedback resonate with each other to promote rattling noise.

The disturbance observer 302 is provided for estimating a disturbance d that is input into the rotation speed control system and for cancelling it. The disturbance observer 302 includes a rotation speed detection delay 35, a torque response delay 36 ($G_{act}(s)$), a control object model $G_p'(s)$, a subtractor 38, and a transfer function 39 ($H_d(s)/G_p'(s)$) composed of an inverse system of the control object model $G_p'(s)$ and a disturbance observer filter $H_d(s)$.

The rotation speed detection delay 35 is treated as a dead time and performs a process to delay the processing by a detection delay time of the rotation speed of the electric generator 1.

The control object model $G_p'(s)$ is a model configured to be equal to an actual control object. The control object model $G_p'(s)$ is given by the following formula.

[Math. 5]

$$G_p'(s) = \frac{1}{J's + C'} \quad (5)$$

where J' is a design value or a measured value of total inertia of the electric generator 1, the engine 2, and the gears 8 interposed between the electric generator 1 and the engine 2 in terms of the electric generator shaft, and C' is a design value of viscous friction coefficient. That is, J' and C' are set to be equal to an actual control object.

The disturbance observer filter $H_d(S)$ is a second-order low-pass filter and is provided for making the inverse system of the control object model $G_p'(s)$ proper. The disturbance observer filter $H_d(s)$ is given by the following formula.

[Math. 6]

$$H_d(s) = \frac{1}{(T_d s + 1)^2} \quad (6)$$

where $T_d$ is a time constant of the disturbance observer filter. Proper in the present invention is defined such that the relative degree between the denominator degree and the numerator degree is zero or more, i.e. denominator degree a numerator degree.

When the disturbance observer filter $H_d(s)$ is given by the formula (6), the transfer function $H_d(s)/G_p'(s)$ composed of the inverse system of the control object model $G_p'(s)$ and the disturbance observer filter $H_d(s)$ is given by the following formula.

[Math. 7]

$$\frac{H_d(s)}{G_p'(s)} = \frac{J's + C'}{(T_d s + 1)^2} \quad (7)$$

Consequently, the transfer function $H_d(s)/G_p'(s)$ becomes such that the degree of the denominator polynomial (denominator degree) is higher than the degree of the numerator polynomial (numerator degree), and therefore, the denominator degree of the transfer function $H_d(s)/G_p'(s)$ becomes higher than the minimum degree required for being proper. That is, the disturbance observer filter $H_d(s)$ of this embodiment is set so that the relative degree (denominator degree–numerator degree) of the transfer function $H_d(s)/G_p'(s)$ becomes 1 or more. As a result, the transfer function $H_d(s)/G_p'(s)$ can reduce the gain on the high-frequency side of the rotation speed detection value that is fed back in the disturbance observer 302.

Then, the subtractor 303 subtracts a disturbance torque T_d being an output of the disturbance observer 302 from a basic torque command value being an output of the model matching compensator 301 to output a torque command value T*.

Consequently, in the rotation speed control of the electric generator 1, even when the rotation speed detection value is fed back, rattling noise is not promoted and can be reduced. Accordingly, rattling noise can be avoided by the rotation speed control of the electric generator 1 without requiring torque of the engine 2 so that it is not necessary to increase the engine rotation speed for avoiding rattling noise as conventionally required, and therefore, motoring with no rattling noise is enabled.

Next, a method for setting the time constant $T_{MM}$ of the model matching compensator filter $H_{MM}(s)$ and the time constant $T_d$ of the disturbance observer filter $H_d(s)$ will be described in detail.

When considered in terms of a Bode plot, the time constant $T_{MM}$ and the time constant $T_d$ are set so that a gain on the high-frequency side assuming that the input and output of the model matching compensator 301 are rotation speeds of the electric generator 1 and a gain on the high-frequency side assuming that the input and output of the disturbance observer 302 are rotation speeds of the electric generator 1 are equal to each other. More specifically, in order to make the gains on the high-frequency side equal to each other, the time constant $T_{MM}$ of the model matching compensator filter $H_{MM}(s)$ and the time constant $T_d$ of the disturbance observer filter $H_d(s)$ may be set to satisfy the following formula.

[Math. 8]
$$T_{MM} = \frac{T_d'(J' - C'T_m)}{J'T_m} \quad (8)$$

By setting the time constant $T_{MM}$ and the time constant $T_d$ in this way, even when filter constants of the model matching compensator filter $H_{MM}(s)$ and the disturbance observer filter $H_d(s)$ are set individually, since transfer characteristics on the high-frequency side that cause rattling noise are uniquely determined, the filters can be easily adapted.

Figure 4:
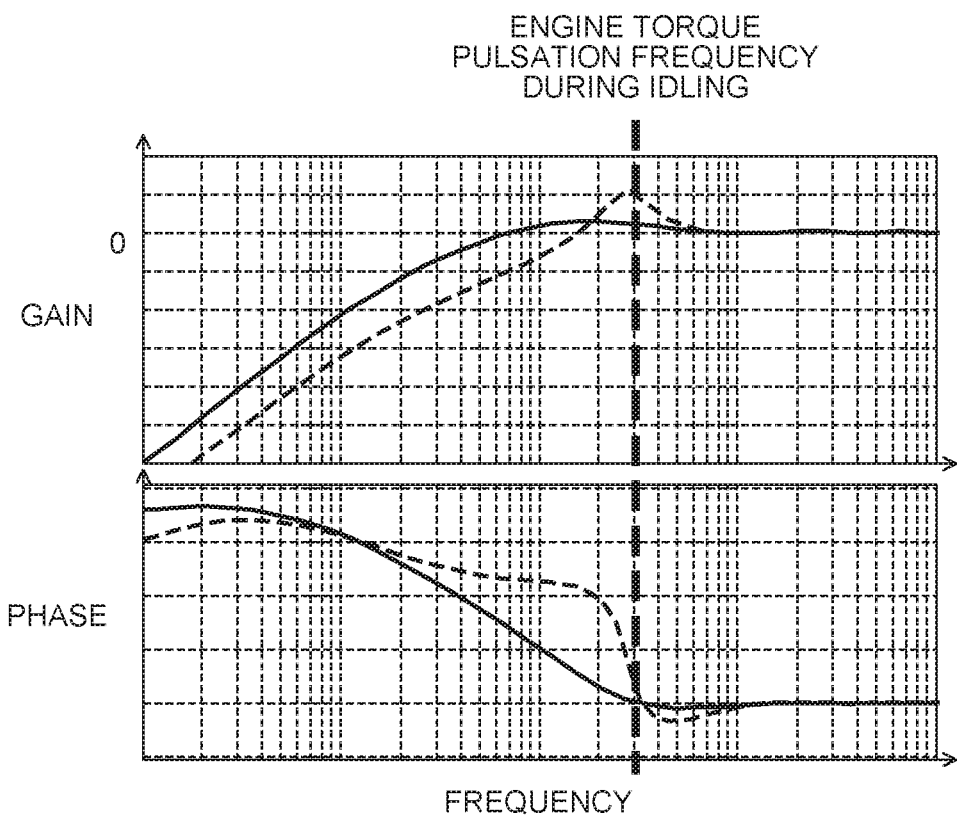
FIG. 4 is a Bode plot of conventional rotation speed control.

Herein, a problem relating to rotation speed control in which a later-described rattling noise countermeasure is not taken in a transfer function from a rotation speed command value too to a torque T shown in FIG. 3 will be described with reference to FIG. 4. FIG. 4 is a Bode plot of frequency response relating to conventional rotation speed control.

Solid lines in FIG. 4 represent frequency response of the transfer function in the case where the total inertia of the electric generator 1, the engine 2, and the gears 8 connecting the electric generator 1 and the engine 2 is equal to the inertia J of the control object $G_p(s)$ (hereinafter also referred to as the case other than dead zone period). On the other hand, broken lines in FIG. 4 represent a frequency characteristic of the transfer function in the case where the inertia J of the control object $G_p(s)$ is only the inertia of the electric generator 1 due to separation of teeth of the gears caused by the influence of backlash of the gears (hereinafter also referred to as the case of dead zone period). The dead zone period is a period in which power is not transmitted between the electric generator 1 and the engine 2 due to the influence of backlash of the gears 8.

Herein, the engine is generally operated at idle speed or more (e.g. 800 rpm or more), and the state of idle speed or less passes before completion of the engine start from cranking (motoring state). In this event, the engine 2 is operated to quickly pass through a resonance frequency, thereby preventing generation of vibration or the like due to resonance. In the case of, for example, a four-cycle engine, torque pulsation due to pumping occurs at the number of cylinders times half the rotation order. In this case, the torque pulsation frequency during idling becomes a frequency indicated by a broken line drawn vertically in FIG. 4.

Normally, as indicated by the solid lines in FIG. 4, the rotation speed control of the electric generator 1 is designed so that frequency response of the transfer function in other than the dead zone period (solid lines) does not have resonance during idling. However, in the conventional rotation speed control, in the dead zone period (broken lines), a frequency that causes resonance (a frequency where the gain of frequency response becomes approximately 0 dB or more) changes toward the high-frequency side according to a decrease in the total inertia of the control object, resulting in frequency response with a high resonant gain. Therefore, in the conventional rotation speed control, resonance occurs at a frequency equal to or higher than an engine torque pulsation frequency during idling.

Figure 5:
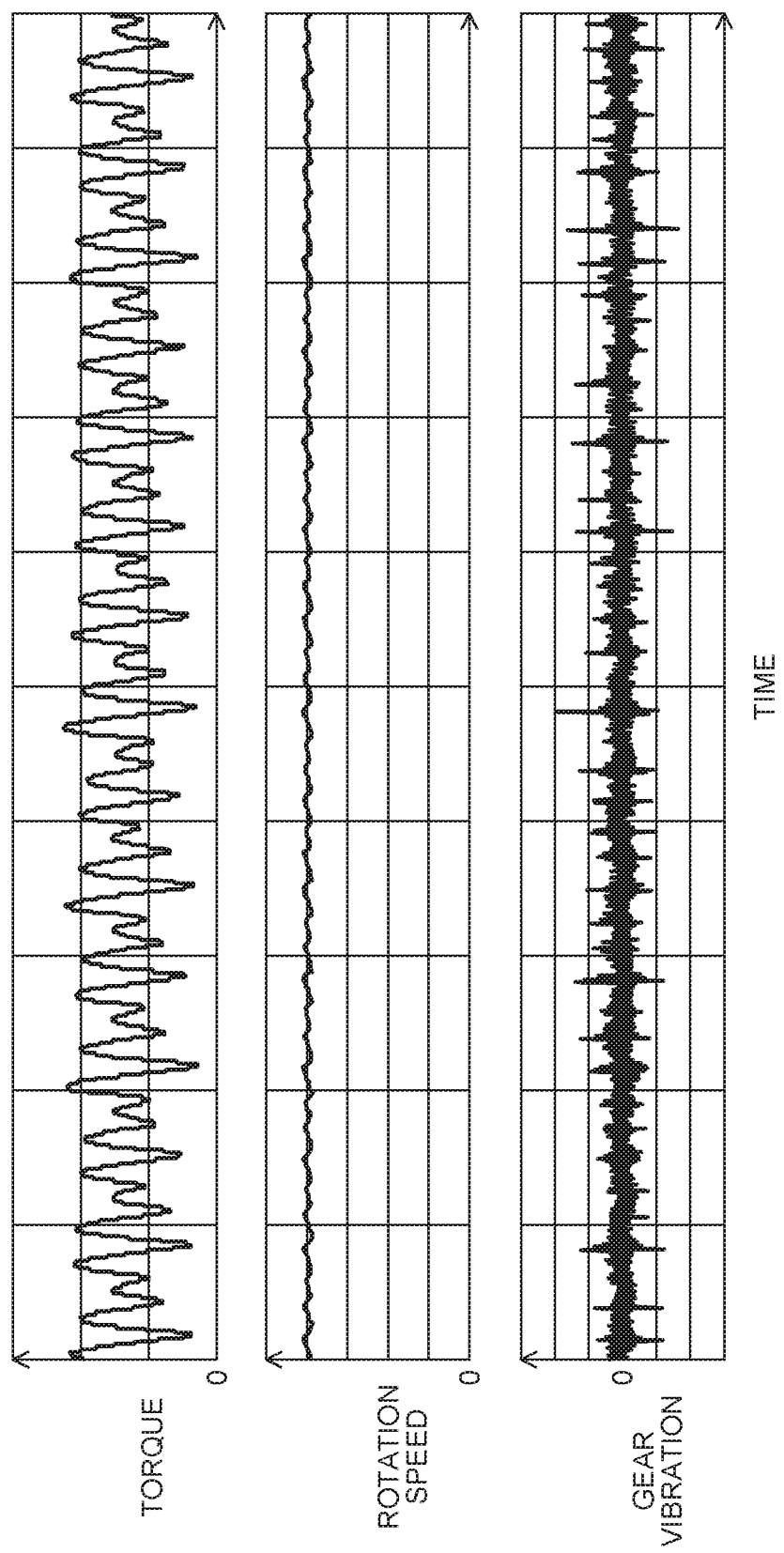
FIG. 5 is a time-series waveform chart showing the control results of the conventional rotation speed control.

FIG. 5 is a diagram showing time-series waveforms of torque, rotation speed, and gear vibration during idling in the conventional rotation speed control shown in FIG. 4. As shown in the figure, torque pulsation and rotation speed fluctuation are not reduced, and the waveform indicating gear vibration is disturbed so that collision between the gears that causes rattling noise is occurring.

In order to avoid this problem, in this embodiment, the time constant $T_{MM}$ of the model matching compensator filter $H_{MM}(S)$ and the time constant $T_d$ of the disturbance observer filter $H_d(s)$ are set in a Bode plot so that a resonance characteristic of transfer characteristic in the rotation speed control system when the moment of inertia of the power transmission system of the control object is equal to the motor inertia becomes equal to or less than an engine pulsation frequency at idle speed (operation tower-limit rotation speed) of the engine 2.

Figure 6:
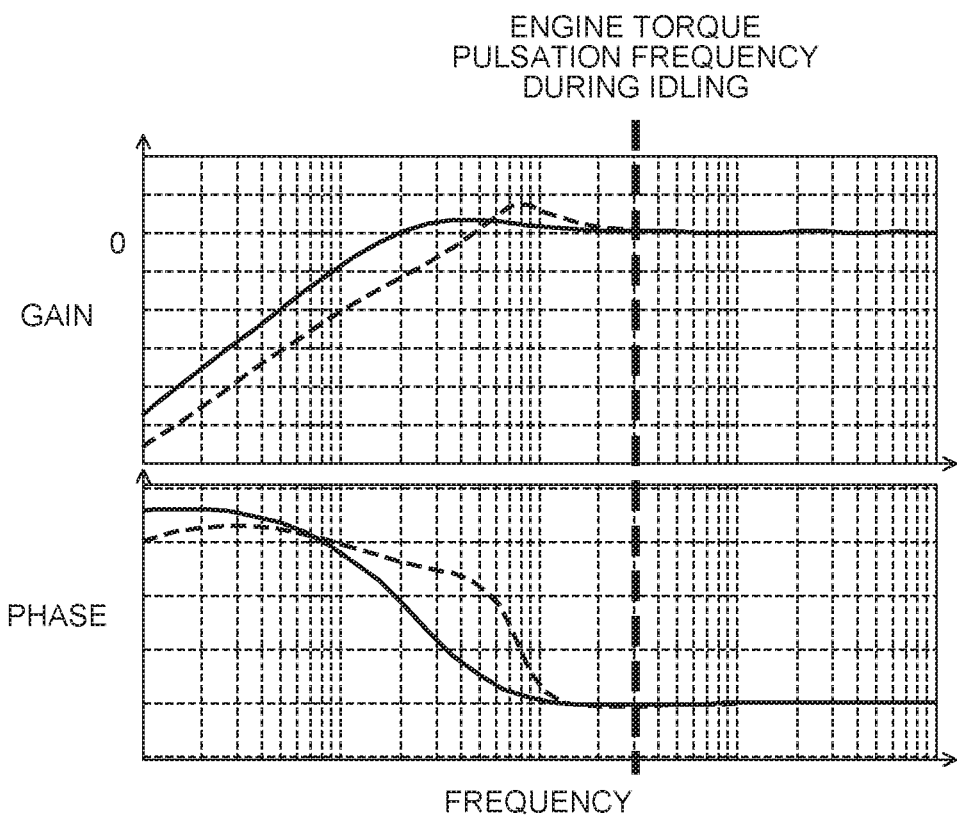
FIG. 6 is a Bode plot of rotation speed control of the embodiment.

FIG. 6 is a Bode plot of frequency response in the rotation speed control of this embodiment where the time constant $T_{MM}$ and the time constant $T_d$ are set as described above. Like in FIG. 4, solid lines in the figure represent frequency response of the transfer function in other than the dead zone period, and broken lines in the figure represent frequency response of the transfer function in the dead zone period.

As shown in the figure, in this embodiment, by adjusting the time constant $T_{MM}$ and the time constant $T_d$ as described above, a frequency that causes resonance is changed to the lower frequency side relative to the engine torque pulsation frequency during idling in the dead zone period. Therefore, since resonance in the normal engine operating range can be avoided, it is possible to avoid generation of rattling noise.

Figure 7:
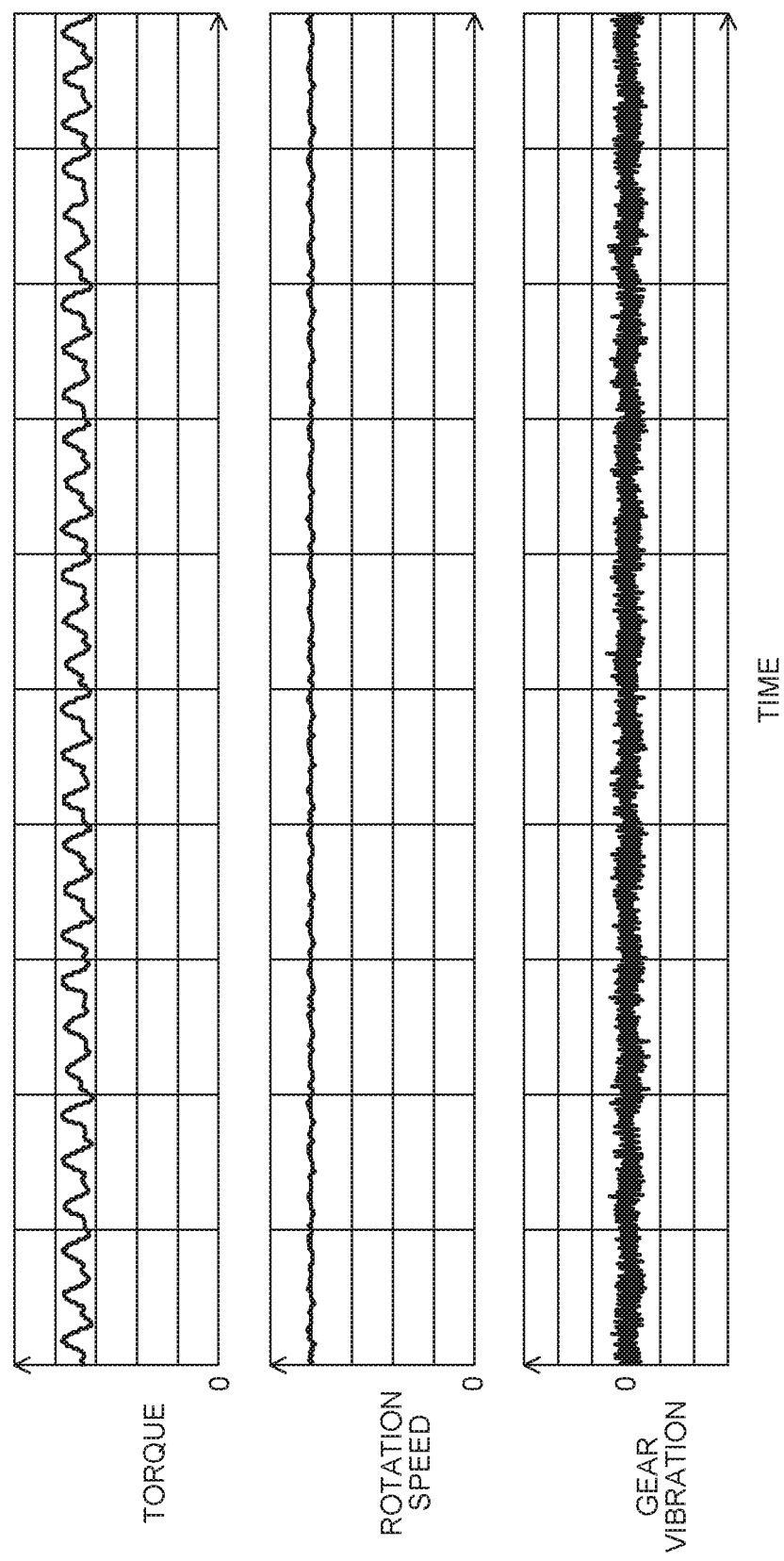
FIG. 7 is a time-series waveform chart showing the control results of the rotation speed control of the embodiment.

FIG. 7 is a diagram showing time-series waveforms of torque, rotation speed, and gear vibration during idling in the rotation speed control of this embodiment shown in FIG. 6. As shown in the figure, torque pulsation and rotation speed fluctuation are reduced, and the waveform indicating gear vibration reveals that collision between the gears that causes rattling noise is not occurring.

The control device for the hybrid vehicle of the embodiment is a control device that realizes a control method for the hybrid vehicle including the engine 2 and the electric generator 1 that generates electric power using power from the engine 2 connected to the electric generator 1 via the gears 8, wherein the control device includes a rotation speed control torque calculation unit configured to, based on a rotation speed command value for the electric generator 1 and a rotation speed detection value of the electric generator 1, calculate a torque command value for controlling the rotation speed of the electric generator, and an electric generator control unit configured to control the electric generator according to the torque command value. The rotation speed control torque calculation unit calculates, using the model matching compensator 301 and based on a value obtained by filtering the rotation speed detection value through the low-pass filter (the model matching compensator filter 34) and the rotation speed command value, a basic torque command value that makes a torque response of the electric generator 1 coincide with a preset model response, calculates, using the disturbance observer 302 including the transfer function $H_d(s)/G_p'(s)$ composed of the inverse system of the control object model $G_p'(s)$ patterned after the power transmission system of the electric generator 1 connected to the engine 2 via the gears 8 and the disturbance observer filter $H_d(s)$, and based on the rotation speed detection value, a disturbance torque T_d that is input into the power transmission system, and calculates the torque command value based on the basic torque command value and the disturbance torque T_d. The relative degree of the disturbance observer filter $H_d(s)$ is set so that the relative degree of the transfer function $H_d(s)/G_p'(s)$ becomes 1 or more.

Consequently, in the rotation speed control of the electric generator 1, since the rotation speed detection value is fed back such that the gain on the high-frequency side of the rotation speed detection value is reduced using the first-order low-pass filter (the model matching compensator filter $H_{MM}(s)$) and the second-order low-pass filter (the disturbance observer filter $H_d(s)$), even when the rotation speed detection value is fed back, rattling noise is not promoted. Accordingly, rattling noise can be avoided by the rotation speed control of the electric generator 1 with no need to increase the rotation speed of the engine 2, and therefore, motoring with no rattling noise is made possible.

Further, according to the control device for the hybrid vehicle of the embodiment, the time constant $T_{MM}$ of the model matching compensator filter 34 included in the model matching compensator 301 and the time constant $T_d$ of the disturbance observer filter included in the disturbance observer 302 are set in the Bode plot so that the gain on the high-frequency side assuming that the input and output of the model matching compensator are electric generator rotation speeds and the gain on the high-frequency side assuming that the input and output of the disturbance observer 302 are electric generator rotation speeds are equal to each other. Consequently, since the transfer characteristics on the high-frequency side of the model matching compensator 301 and the disturbance observer filter that cause rattling noise can be uniquely determined, the filters can be easily adapted.

Further, according to the control device for the hybrid vehicle of the embodiment, the time constant $T_{MM}$ of the model matching compensator filter 34 included in the model matching compensator 301 and the time constant $T_d$ of the disturbance observer filter included in the disturbance observer 302 are set in the Bode plot so that the resonance characteristic of transfer characteristic in the rotation speed control system when the moment of inertia of the power transmission system is equal to the motor inertia becomes equal to or less than the engine pulsation frequency at the operation lower-limit rotation speed of the engine 2. Consequently, resonance of vibration components due to torque pulsation or the like can be avoided at idle speed or higher so that it is possible to avoid generation of rattling noise in the normal engine operating range.

While the embodiment of the present invention has been described above, the above-described embodiment only shows part of application examples of the present invention and is not intended to limit the technical scope of the present invention to the specific configurations of the above-described embodiment.

The invention claimed is:

1. A control method for a hybrid vehicle including an engine and an electric generator that generates electric power using power from the engine connected to the electric generator via a gear, the control method comprising:
    a rotation speed control torque calculation step of, based on a rotation speed command value for the electric generator and a rotation speed detection value of the electric generator, calculating a torque command value for controlling a rotation speed of the electric generator; and
    an electric generator control step of controlling the electric generator according to the torque command value, wherein the rotation speed control torque calculation step calculates, using a model matching compensator and based on a value obtained by filtering the rotation speed detection value through a low-pass filter and the rotation speed command value, a basic torque command value that makes a torque response of the electric generator coincide with a preset model response;
    calculates, using a disturbance observer including a transfer function composed of an inverse system of a control object model patterned after a power transmission system of the electric generator connected to the engine via the gear and a disturbance observer filter composed of a low-pass filter, and based on the rotation speed detection value, a disturbance torque that is input into the power transmission system; and
    calculates the torque command value based on the basic torque command value and the disturbance torque, and wherein a relative degree of the disturbance observer filter is set so that a relative degree of the transfer function becomes 1 or more.

2. The control method for the hybrid vehicle according to claim 1, wherein a time constant of the low-pass filter included in the model matching compensator and a time constant of the disturbance observer filter included in the disturbance observer are set in a Bode plot so that a gain on a high-frequency side assuming that an input and an output of the model matching compensator are electric generator rotation speeds and a gain on the high-frequency side assuming that an input and an output of the disturbance observer are electric generator rotation speeds are equal to each other.

3. The control method for the hybrid vehicle according to claim 1, wherein a time constant of the low-pass filter included in the model matching compensator and a time constant of the disturbance observer filter included in the disturbance observer are set in a Bode plot so that a resonance characteristic of transfer characteristic in a rotation speed control system when a moment of inertia of the power transmission system is equal to a motor inertia becomes equal to or less than an engine pulsation frequency at an operation lower-limit rotation speed of the engine.

4. A control device for a hybrid vehicle including an engine and an electric generator that generates electric power using power from the engine, the control device comprising:
   a rotation speed control torque calculation unit configured to, based on a rotation speed command value for the electric generator and a rotation speed detection value of the electric generator, calculate a torque command value for controlling a rotation speed of the electric generator; and
   an electric generator control unit configured to control the electric generator according to the torque command value, wherein the rotation speed control torque calculation unit includes:

a model matching compensator configured to, based on a value obtained by filtering the rotation speed detection value through a low-pass filter and the rotation speed command value, calculate a basic torque command value that makes a torque response of the electric generator coincide with a preset model response;

a disturbance observer configured to, using a transfer function composed of an inverse system of a control object model patterned after a power transmission system of the electric generator connected to the engine via a gear and a disturbance observer filter composed of a low-pass filter, and based on the rotation speed detection value, calculate a disturbance torque that is input into the power transmission system; and a calculator configured to calculate the torque command value based on the basic torque command value and the disturbance torque, and wherein a relative degree of the disturbance observer filter is set so that a relative degree of the transfer function becomes 1 or more.

* * * * *